US006597167B2

(12) United States Patent
Miyata et al.

(10) Patent No.: US 6,597,167 B2
(45) Date of Patent: Jul. 22, 2003

(54) RELATIVE-DISPLACEMENT DETECTING UNIT AND RELATIVE-DISPLACEMENT DETECTING DEVICE

(75) Inventors: Toshiharu Miyata, Kawasaki (JP); Tetsuro Kiriyama, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/911,204

(22) Filed: Jul. 23, 2001

(65) Prior Publication Data

US 2002/0011839 A1 Jan. 31, 2002

(30) Foreign Application Priority Data

Jul. 24, 2000 (JP) ........................................ 2000-222217

(51) Int. Cl.⁷ ................................................ G01B 7/14
(52) U.S. Cl. .......................... 324/207.17; 324/207.16; 324/207.24; 257/422
(58) Field of Search ................... 324/207.17, 207.21, 324/207.24, 207.25, 249, 259; 257/422; 360/319; 336/84 M; 343/700 MS, 841, 905

(56) References Cited

U.S. PATENT DOCUMENTS

| 5,315,245 A | * | 5/1994 | Schroeder et al. ...... 324/207.21 |
| 5,583,436 A | * | 12/1996 | Van De Walle et al. .... 324/252 |
| 5,815,091 A | * | 9/1998 | Dames et al. .......... 340/870.34 |
| 5,841,274 A | * | 11/1998 | Masreliez et al. ...... 324/207.17 |
| 5,925,866 A | * | 7/1999 | Yeckley ...................... 235/449 |
| 6,118,271 A | * | 9/2000 | Ely et al. ............... 324/207.17 |
| 6,124,708 A | * | 9/2000 | Dames .................. 324/207.12 |

FOREIGN PATENT DOCUMENTS

| JP | 58211608 A | 12/1983 |
| JP | 10160512 A | 6/1998 |
| JP | 11223532 A | 8/1999 |
| JP | 2001255107 A | 9/2001 |

* cited by examiner

Primary Examiner—Edward Lefkowitz
Assistant Examiner—Darrell Kinder
(74) Attorney, Agent, or Firm—Rankin, Hill, Porter & Clark LLP

(57) ABSTRACT

An encoder unit is disposed facing a scale. The encoder unit is constructed such that a processing circuit and a read head are integrally formed on one and the same semiconductor substrate. This construction results in size reduction and integral formation of the encoder unit.

13 Claims, 6 Drawing Sheets

RELATIVE-DISPLACEMENT DETECTING UNIT AND RELATIVE-DISPLACEMENT DETECTING DEVICE

BACKGROUND OF THE INVENTION

1. Field of the Invention

The present invention relates to a relative-displacement detecting unit and a relative-displacement detecting device; and more particularly to a technique to achieve the size reduction and high accuracy detection of a unit for outputting its displacement relative to a scale in the form of an electrical signal.

2. Description of the Related Art

In related art, a transducer or an encoder for detecting relative displacement is known. In a capacitance-type encoder, a transmission electrode and a reception electrode are provided on a grid (unit), and a signal electrode is provided on a scale opposing this unit. The transmission electrode and the reception electrode on the unit are capacity-coupled with the signal electrode on the scale. A drive signal is supplied to the transmission electrode, and a detected signal occurring in the reception electrode in correspondence with the relative position of the unit and the scale is processed by a processing circuit. Thus, it is possible to detect the movement or the position of the unit with respect to the scale. In an induction-type encoder, the relative position is detected on the basis of the electromagnetic interaction (electromagnetic induction) between the unit and the scale. Namely, a transmission coil (excitation coil) and a detection coil are disposed on the unit, and a scale coil is formed on the scale. As current is fed to the excitation coil on the unit, a magnetic flux occurs, and an induced current is generated in the scale coil on the scale by electromagnetic induction. A magnetic flux is generated by the induced current generated in the scale coil, and an induced current (induced voltage) is generated in the detection coil on the unit by the magnetic flux. Since the induced voltage varies in correspondence with the relative position of the excitation coil and the scale coil, the relative position of the unit and the scale can be detected by detecting the induced voltage generated in the detection coil. In the encoder as mentioned above, much effort has been made to reduce the size of both the unit and scale, with an intention of increasing a detection accuracy and reducing the size of the unit and scale.

Even if the unit size is reduced, stray inductance and capacitance (stray LC) are present among the wires connecting the unit to its peripheral electric circuits and will degrade the encoder performance unless the peripheral electric circuits are integrated together with the unit.

SUMMARY OF THE INVENTION

Accordingly, an object of the present invention is to reduce the stray LC by integrating the encoder unit and its peripheral electric circuits on a substrate.

The above-mentioned object can be achieved by a relative-displacement detecting unit, according to the present invention, disposed facing a scale, for detecting its displacement relative to the scale and outputting a detected relative-displacement in the form of an electrical signal. The relative-displacement detecting unit includes a read head and a processing circuit. The read head detects a displacement of the relative-displacement detecting unit relative to the scale. The processing circuit drives the read head, processes signal output from the read head, and outputs the processed signal to exterior. The read head and the processing circuit are integrally formed on a semiconductor substrate.

Since the read head and the processing circuit are both integrally formed on a semiconductor substrate, the stray LC caused by wiring is suppressed and hence size reduction and high accuracy detection are realized. Here, "to integrally form" means not only to form those circuits on one and the same surface of the substrate, but also to form those circuits on different layers of the substrate.

The relative-displacement detecting unit may further comprise a magnetic shielding layer provided between the read head and the processing circuit. In the invention, the read head and the processing circuit are formed close to each other. A magnetic field developed from the read head directly affects the processing circuit (This phenomenon is called cross talk.). Provision of the magnetic shielding layer between the read head and the processing circuit prevents the cross talk. This results in increase of detection sensitivity. The magnetic shielding layer is made of high magnetic permeability material, e.g., ferrite, or may be a metal layer.

In the above-mentioned relative-displacement detecting unit, the processing circuit is preferably formed by a patterning process, and the read head is preferably formed by a resin buildup process. The relative-displacement detecting unit of the invention is integrally formed on a semiconductor substrate. In this case, the same forming process is not always used for forming the processing circuit and the read head. Rather, an active element portion (processing circuit portion) and a passive element portion (read head portion) may be formed by different forming processes.

Since the relative-displacement detecting unit is integrally formed on the semiconductor substrate, various mounting methods may selectively be used when the unit is mounted on a board. The relative-displacement detecting unit is mounted on a board by wire bonding, thereby forming a relative-displacement detecting device. The relative-displacement detecting unit may be mounted on a board by use of flip chips. Further, the relative-displacement detecting unit may be incorporated into a package mounted on a board.

BRIEF DESCRIPTION OF THE DRAWINGS

These and further features of the invention will be apparent with reference to the following description and drawings, wherein.

DETAILED DESCRIPTION OF THE INVENTION

The preferred embodiments of the present invention will be described with reference to the accompanying drawings. In the description, the invention is implemented into an induction-type encoder (magnetic-type encoder), by way of example.

Figure 1:
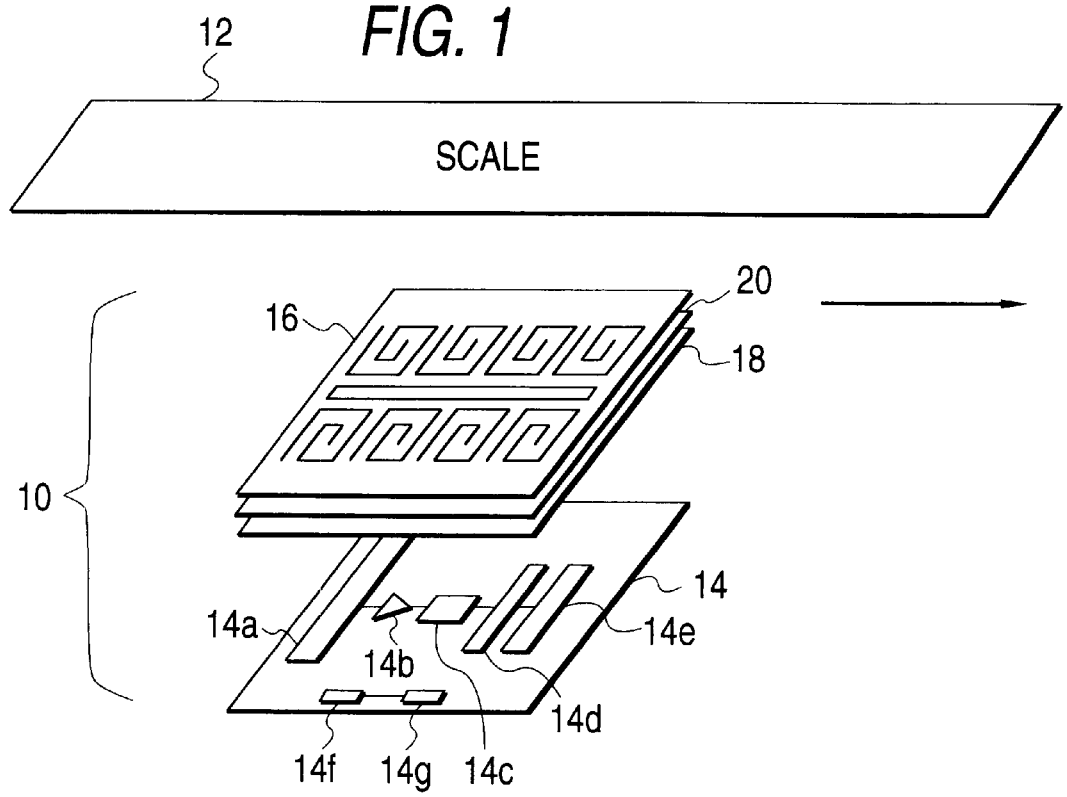
FIG. 1 is a diagram showing a scheme of an embodiment of the present invention.

FIG. 1 shows an arrangement of an induction-type encoder that is an embodiment of the invention. The induction-type encoder includes an encoder unit (relative-displacement detecting unit) 10 and a scale 12 located facing the encoder unit 10. The encoder unit 10 includes a processing circuit 14, a metal film 18, a high magnetic permeability film 20, and a read head 16, which are integrally formed on a silicon substrate. The processing circuit 14 includes circuits for feeding a drive current to an excitation coil (transmission coil) of the read head 16 and circuits for processing a detected signal derived from a detection coil of the read head 16 and outputting the processed signal to exterior. Specifically, the processing circuit 14 includes a multiplexer 14a, an amplifier 14b, a relative-displacement detecting circuit 14c, an A/D converter 14d, an output circuit 14e, an oscillator circuit 14f, and a drive circuit 14g. The multiplexer 14a selectively outputs detected signals of different phases output from the detection coil. The amplifier 14b amplifies the detected signal from the multiplexer 14a. The relative-displacement detecting circuit 14c detects a displacement of the encoder unit relative to the scale 12 by using the amplified detected signal. The A/D converter 14d converts detected analog signal into digital data. The output circuit 14e outputs the digital data to exterior. The oscillator circuit 14f and the drive circuit 14g feed the drive current to the transmission coil. The processing circuit 14 is formed on a silicon substrate by a known IC forming process. The metal film 18 and the high magnetic permeability film 20 are layered on the processing circuit. These films have a magnetic shielding function for shielding the processing circuit from a magnetic flux developed from the transmission coil in the read head 16. The metal film 18 may be made of aluminum, copper, or gold, and the high magnetic permeability film 20 may be made of ferrite or Permalloy.

Figure 2:
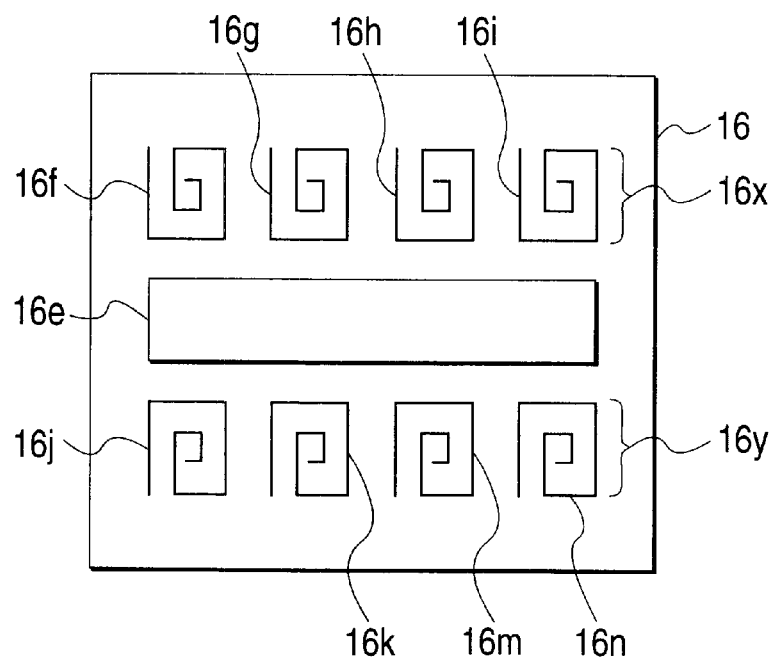
FIG. 2 is a diagram schematically showing a read head used in the arrangement of FIG. 1.

As shown in FIG. 2, the read head 16 includes a transmission coil 16e, and reception coil groups 16x and 16y, which are differentially related. The reception coil group 16x consists of a plurality of reception coils 16f to 16i. The reception coils 16f to 16i are arranged at an interval of (¼)λ.(λ=wave length of a scale coil) in a length measuring direction indicated by an arrow in FIG. 1. Accordingly, the reception coils produce signals whose phases are 0°, 90°, 180° and 270°. The reception coil 16f and 16h are connected to each other, and the reception coils 16g and 16i are also connected to each other. Those interconnected reception coils produce detected signals of different phases (0° and 90°). Also in the reception coil group 16y, the reception coils 16j to 16n are connected as in the reception coil group 16x. The reception coil group 16y produces signals that are shifted by 180° from those by the reception coil group 16x. Those signals function as differential signals.

Figure 3:
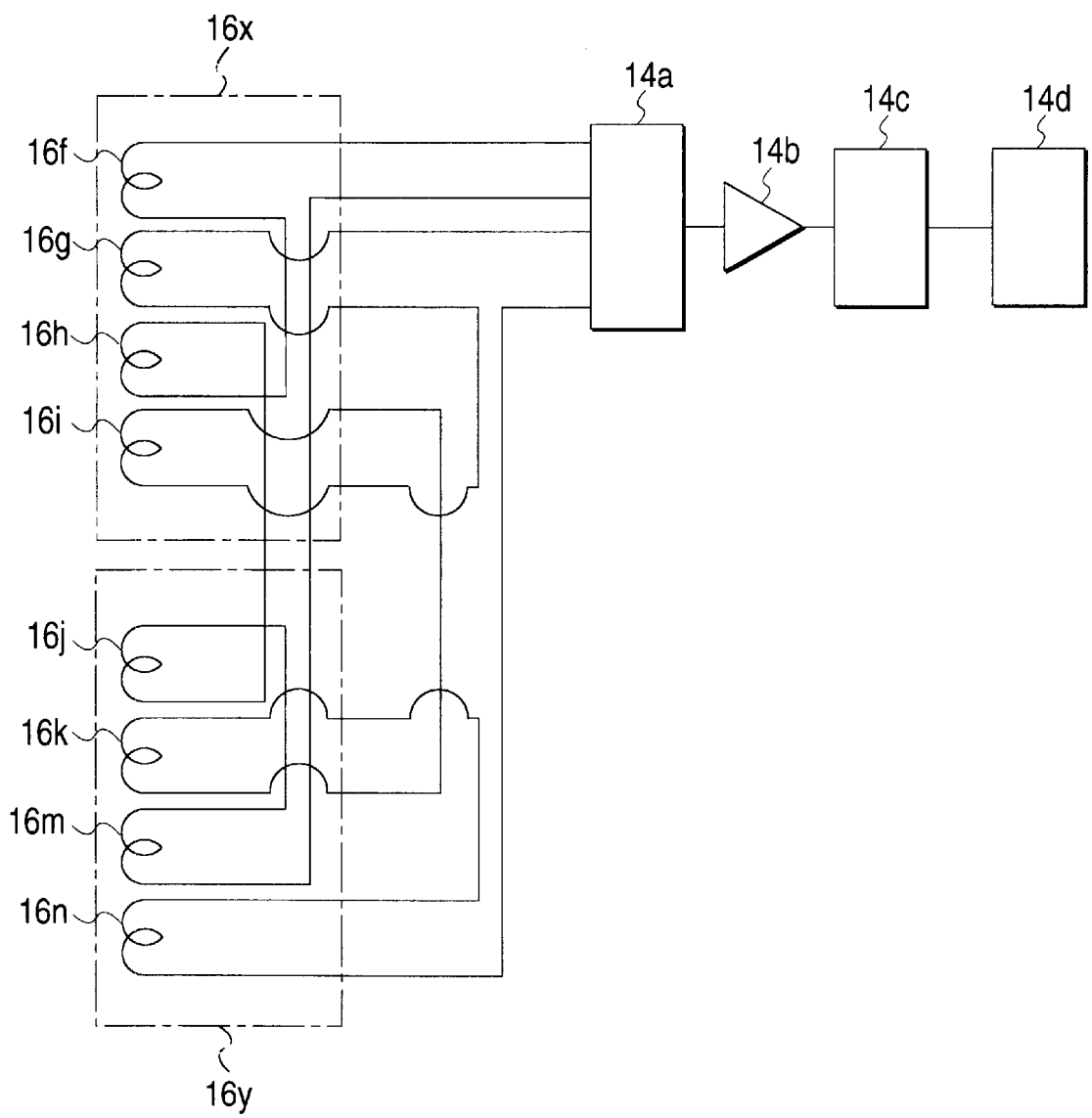
FIG. 3 is a circuit diagram showing an electrical circuit arrangement of the embodiment of FIG. 1.

FIG. 3 shows a circuit arrangement including the processing circuit 14 and the read head 16 of the induction-type encoder shown in FIGS. 1 and 2. As already stated, the reception coils 16f and 16h of the reception coil group 16x are interconnected to output a detected signal of 0° in phase, and the reception coils 16g and 16i are interconnected to output a detected signal of 90° in phase. The reception coils 16f and 16h of the reception coil group 16x are respectively connected to the reception coils 16j and 16m of the reception coil group 16y. The reception coils 16g and 16i of the reception coil group 16x are respectively connected to the reception coils 16k and 16n of the reception coil group 16y.

The detected signal (whose phase is 0°) of the reception coils 16f and 16h and the detected signal (whose phase is 90°) of the reception coils 16g and 16i are both input to the multiplexer 14a of the processing circuit 14. The multiplexer 14a alternately selects one of those detected signals, and outputs the selected one to the amplifier 14b. The amplifier 14b amplifies the detected signal, and outputs it to the relative-displacement detecting circuit 14c. The detected relative-displacement data is supplied, through the A/D converter 14d, to the output circuit 14e, which, in turn, supplies the received data to exterior.

Thus, in the embodiment, the processing circuit 14 and the read head 16 are integrally formed on one and the same silicon substrate. Accordingly, the encoder unit 10 may be reduced in size. Further, the feature of the reduced distance between the processing circuit 14 and the read head 16 accrues to reduction of the stray LC among the wires between the processing circuit 14 and the read head 16 and, hence, to no generation of noise and cross talk and securing a high level accuracy.

As already stated, in the present embodiment, the high magnetic permeability film 20, which is typically made of ferrite, and the metal film 18, which has low electric resistance, are provided between the read head 16 and the processing circuit 14. Provision of these films contributes to increase the detection sensitivity. If required, the high magnetic permeability film 20 or the metal film 18 may be used instead.

Figure 4:
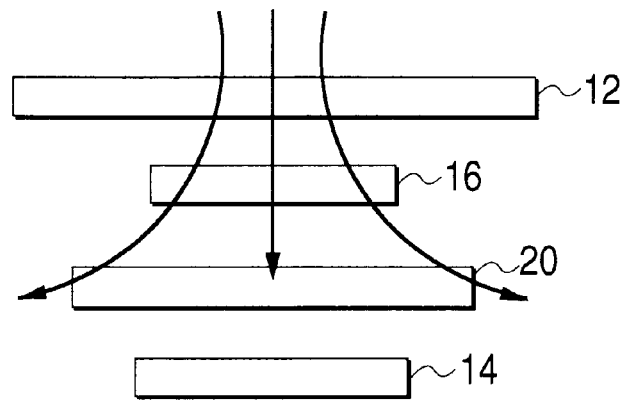
FIG. 4 is a diagram for explaining a high magnetic permeability film used in the embodiments of the invention.

FIG. 4 depicts a magnetic field in a structural arrangement of a case where the high magnetic permeability film 20 of a ferrite film, for example, is provided between the read head 16, which faces the scale 12, and the processing circuit 14. If the high magnetic permeability film 20 is not present in the structure, a magnetic field developed from the transmission coil in the read head 16 directly reaches the processing circuit 14. As a result, a so-called cross talk occurs to possibly generate noise. Use of the high magnetic permeability film 20, however, reduces an intensity of the magnetic field reaching the processing circuit 14, thereby suppressing the generation of the cross talk.

Figure 5:
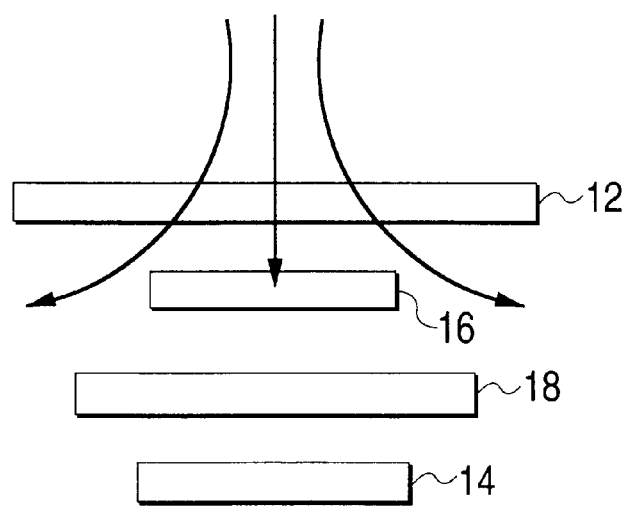
FIG. 5 is a diagram for explaining a metal film used in the embodiments of the invention.

FIG. 5 illustrates a magnetic field distributed in a structural arrangement in which the metal film 18 made of copper, for example, is provided between the read head 16 and the processing circuit 14. As seen, a magnetic field developed from the transmission coil in the read head 16 reaches the metal film 18, so that an eddy current is induced in the metal film 18 by the magnetic field. The eddy current generated has such a direction as to suppress the magnetic field. Hence, this leads to the suppressing of the magnetic field directly reaching the processing circuit 14.

While the embodiment that is believed to be preferred has been described, it should be understood that the invention is not limited to the above-mentioned one, but may variously be modified, altered and changed within the true spirit and scope of the invention. It is noted that in the embodiment, the encoder unit 10 is integrally formed on the silicon substrate. This feature creates the following advantage: it is easily mounted on another printed circuit board, a ceramic board, a glass board or the like by wire bonding or another suitable technique. Accordingly, it is easy to apply the invention to other relative-displacement detecting devices, in addition to the linear encoder.

Figure 6:
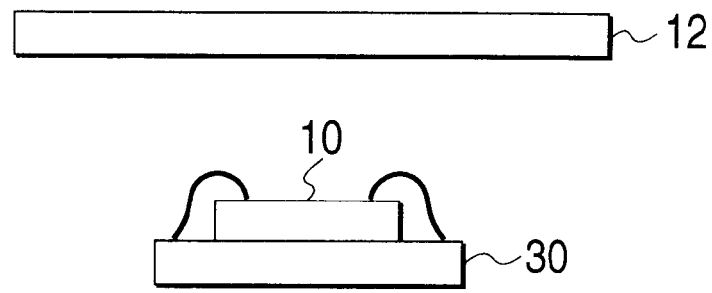
FIG. 6 is a diagram showing a mounting structure in the embodiments.

FIG. 6 illustrates a case where an encoder unit 10 constructed according to the invention is mounted on a board 30 by wire bonding technique. The board 30 may be any of the printed circuit board, the. glass board, the ceramic board, and the like.

Figure 7:
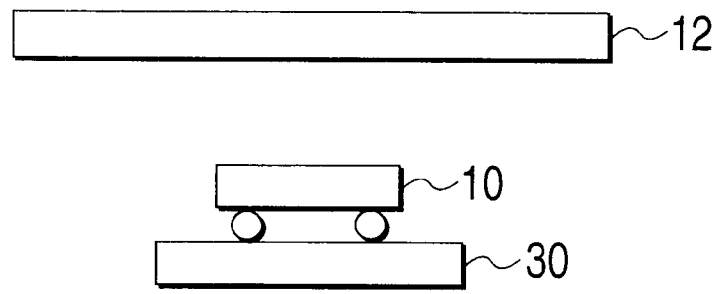
FIG. 7 is a diagram showing another mounting structure in the embodiments.

FIG. 7 illustrates a case where an encoder unit 10 of the invention is mounted on a board 30 by use of flip chips. Terminals are gathered on one side of the encoder unit 10, and connected to the board. Combination of the encoder unit 10 and the flip chips will facilitate a further size reduction of the device.

Figure 8:
FIG. 8 is a diagram showing still another mounting structure in the embodiments.
Figure 8:
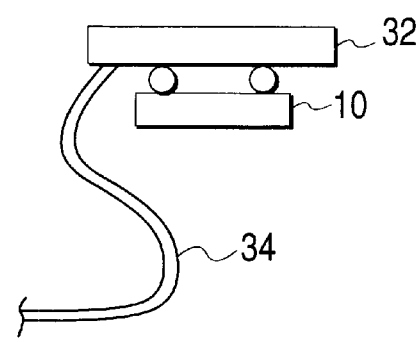

FIG. 8 illustrates another case where the encoder unit 10 is mounted on a board by use of flip chips. As shown, a glass board 32 is provided facing a scale 12. An encoder unit 10 is mounted on the reverse side (opposite to the side of the glass board facing the scale 12) of the glass board by use of flip chips. The glass board 32 is connected to an external processor:device by use of a FPC (flexible print circuit) 34.

Figure 9:
FIG. 9 is a diagram showing yet another mounting structure in the embodiments.
Figure 9:
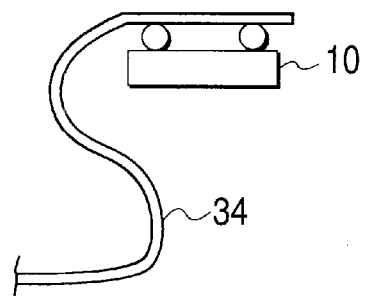

FIG. 9 illustrates a case where the encoder unit 10 of the embodiment is connected to a tape-like FPC 34 by TAB (tape automated bonding) process.

Figure 10:
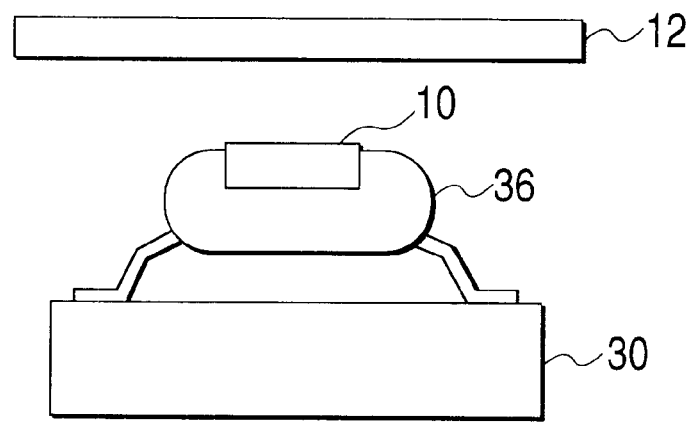
FIG. 10 is a diagram showing a further mounting structure in the embodiments.

Further, the encoder unit 10 of the embodiment, as shown in FIG. 10, may be incorporated into a package (e.g., QPF package) 36 mounted on a board 30.

Figure 11:
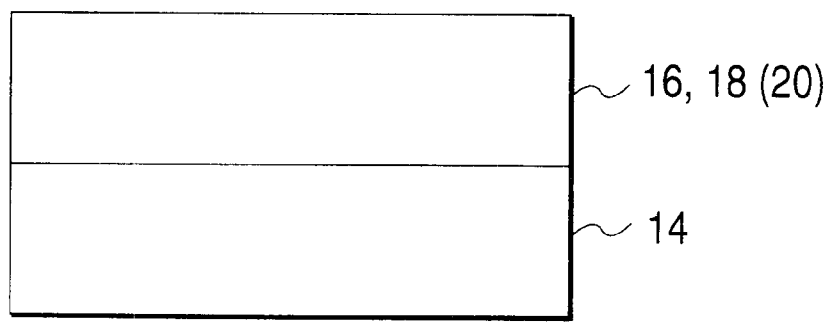
FIG. 11 is a schematic illustration of another encoder unit in the embodiments.

In each embodiment, the encoder unit 10 is integrally formed onto the silicon substrate. In this case, it is not essential to form the encoder unit by one forming process. The encoder unit may also be formed in the following manner. As shown in FIG. 11, a portion of the processing circuit 14 is formed on a substrate by a known IC forming process while another portion including the read head 16, which includes the transmission and reception coils, the metal film 18 and others is formed by layering resin (as a build-up board).

As seen from the foregoing description, the present invention succeeds in reducing the size of the encoder unit and integrally forming the same, and hence in suppressing a stray LC appearing among the wires and realizing high accuracy detection.

What is claimed is:

1. A relative-displacement detecting unit, disposed facing a scale, for detecting its displacement relative to said scale and outputting a detected relative-displacement in the form of an electrical signal, said relative-displacement detecting unit comprising:
   a read head for detecting a displacement of said relative-displacement detecting unit relative to said scale;
   a processing circuit for driving said read head, processing signal output from said read head, and outputting the processed signal; and,
   a magnetic shielding layer provided between said read head and said processing circuit;
   wherein said read head, said magnetic shielding layer, and said processing circuit are integrally formed on a semiconductor substrate.

2. The relative-displacement detecting unit according to claim 1, wherein said read head detects the displacement of said relative-displacement detecting unit relative to said scale through an electromagnetic action, said read head including:
   a transmission coil; and
   a plurality of reception coils for detecting a magnetic field caused by current induced in the scale under a magnetic field developed from said transmission coil in the form of signals whose phases are different from each other.

3. The relative-displacement detecting unit according to claim 1, wherein said magnetic shielding layer is made of a high magnetic permeability material.

4. The relative-displacement detecting unit according to claim 1, wherein said magnetic shielding layer includes a metal layer with low electric resistance.

5. The relative-displacement detecting unit according to claim 4, wherein said metal layer is made of aluminum, copper, or gold.

6. A relative-displacement detecting device comprising:
   a board; and
   a relative-displacement detecting unit mounted on said board, said relative-displacement detecting unit, disposed facing a scale, for detecting its displacement relative to said scale and outputting a detected relative-displacement in the form of an electrical signal, said relative-displacement detecting unit comprising:
   a read head for detecting a displacement of said relative-displacement detecting unit relative to said scale;
   a processing circuit for driving said read head, processing signal output from said read head, and outputting the processed signal; and,
   a magnetic shielding layer provided between said read head and said processing circuit;
   wherein said read head, said magnetic shielding layer, and said processing circuit are integrally formed on a semiconductor substrate.

7. The relative-displacement detecting device according to claim 6, wherein said relative-displacement detecting unit is mounted on said board by wire bonding.

8. The relative-displacement detecting device according to claim 6, wherein said relative-displacement detecting unit is mounted on said board by use of flip chips.

9. The relative-displacement detecting device according to claim 6, wherein said relative-displacement detecting unit is incorporated into a package mounted on said board.

10. The relative-displacement detecting device according to claim 6, wherein said read head detects the displacement of said relative-displacement detecting unit relative to said scale through an electromagnetic action, said read head including:
    a transmission coil; and
    a plurality of reception coils for detecting a magnetic field caused by current induced in the scale under a magnetic field developed from said transmission coil in the form of signals whose phases are different from each other.

11. The relative-displacement detecting unit according to claim 6, wherein said magnetic shielding layer is made of a high magnetic permeability material.

12. The relative-displacement detecting unit according to claim 6, wherein said magnetic shielding layer includes a metal layer with low electric resistance.

13. The relative-displacement detecting unit according to claim 12, wherein said metal layer is made of aluminum, copper, or gold.

* * * * *